United States Patent
Tomoi

(10) Patent No.: US 8,302,648 B2
(45) Date of Patent: Nov. 6, 2012

(54) PNEUMATIC TIRE

(75) Inventor: Shusaku Tomoi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 331 days.

(21) Appl. No.: 12/439,740

(22) PCT Filed: Sep. 4, 2007

(86) PCT No.: PCT/JP2007/067553
§ 371 (c)(1),
(2), (4) Date: Mar. 3, 2009

(87) PCT Pub. No.: WO2008/029939
PCT Pub. Date: Mar. 13, 2008

(65) Prior Publication Data
US 2010/0186866 A1    Jul. 29, 2010

(30) Foreign Application Priority Data
Sep. 4, 2006 (JP) ................... 2006-239032

(51) Int. Cl.
*B60C 5/14* (2006.01)
(52) U.S. Cl. .. 152/511; 152/450; 152/510; 152/DIG. 16
(58) Field of Classification Search ........... 152/450, 152/510, 511, 512, 513, DIG. 16
See application file for complete search history.

(56) References Cited

U.S. PATENT DOCUMENTS

| | | | |
|---|---|---|---|
| 5,738,158 A * | 4/1998 | Ozawa et al. | 152/510 |
| 5,851,323 A * | 12/1998 | Kaido et al. | 152/510 |
| 5,910,544 A * | 6/1999 | Ozawa et al. | 525/178 |
| 5,938,869 A * | 8/1999 | Kaido et al. | 152/510 |
| 5,992,486 A * | 11/1999 | Katsuki et al. | 152/510 |
| 6,024,816 A * | 2/2000 | Yamakawa et al. | 156/123 |
| 6,062,283 A * | 5/2000 | Watanabe et al. | 152/510 |
| 6,079,465 A * | 6/2000 | Takeyama et al. | 152/510 |
| 6,079,466 A * | 6/2000 | Watanabe et al. | 152/510 |
| 6,179,941 B1 * | 1/2001 | Yamakawa et al. | 156/123 |
| 6,244,317 B1 * | 6/2001 | Yamakawa et al. | 152/510 |
| 6,334,919 B1 * | 1/2002 | Takeyama et al. | 156/123 |
| 6,397,912 B1 * | 6/2002 | Watanabe et al. | 152/510 |
| 6,397,913 B1 * | 6/2002 | Kanenari et al. | 152/517 |
| 7,117,911 B2 * | 10/2006 | Kanenari et al. | 152/516 |
| 7,404,424 B2 * | 7/2008 | Higuchi et al. | 152/458 |
| 7,530,380 B2 * | 5/2009 | Muraoka et al. | 152/510 |
| 2004/0031550 A1 * | 2/2004 | Kanenari et al. | 152/516 |
| 2005/0098252 A1 * | 5/2005 | Muraoka et al. | 152/510 |
| 2005/0103417 A1 * | 5/2005 | Watanabe et al. | 152/510 |
| 2006/0144495 A1 * | 7/2006 | Higuchi et al. | 152/510 |

FOREIGN PATENT DOCUMENTS

| | | |
|---|---|---|
| CN | 1744998 A | 3/2006 |
| JP | 1314164 | 12/1989 |
| JP | 8216610 | 8/1996 |
| JP | 8258506 | 10/1996 |
| JP | 9314752 | 12/1997 |
| JP | 11240108 | 9/1999 |
| JP | 200326931 | 1/2003 |
| JP | 2004176048 | 6/2004 |
| WO | WO-2007083785 | 7/2007 |

* cited by examiner

*Primary Examiner* — Joseph Del Sole
*Assistant Examiner* — Seyed Masoud Malekzadeh
(74) *Attorney, Agent, or Firm* — Connolly Bove Lodge & Hutz LLP

(57) ABSTRACT

A pneumatic tire comprising an air permeation preventive layer comprising a film of a thermoplastic resin composition containing a polyvinyl alcohol or ethylene vinyl alcohol copolymer, to which a protective film of a rubber composition containing an ethylene propylene rubber (EPM) or ethylene propylene diene rubber (EPDM) is, directly or via an adhesive, placed adjacent thereto, as one layer in at least one side thereof, whereby both a further reduction in the air leakage rate of the pneumatic tire and a good durability can be achieved and furthermore a reduction in the weight of the tire can be achieved.

10 Claims, No Drawings

PNEUMATIC TIRE

CROSS REFERENCE TO RELATED APPLICATIONS

This application is a National Stage of PCT/JP2007/067553 filed Sep. 4, 2007 which in turn claims priority from Japanese Application 2006-239032 filed Sep. 4, 2006, the entire contents of which are incorporated herein by reference.

TECHNICAL FIELD

The present invention relates to a pneumatic tire, more specifically relates to a pneumatic tire capable of reducing an air leakage rate of a pneumatic tire, improving of durability and further reducing the weight thereof.

BACKGROUND ART

Reduction of the fuel consumption rate is one of the major technical challenges in the automobile industry. As part of these measures, reducing the weight of pneumatic tires has become increasingly demanded. The inside surface of a pneumatic tire is generally provided with an air permeation preventive layer such as an inner liner layer comprised of a low gas permeability rubber such as a halogenated butyl rubber so as to maintain the tire air pressure constant. As one technique for reducing the weight of a tire, the technique of replacing the butyl rubber or other low gas permeability rubber, used as the inner liner layer of the pneumatic tire, with various materials capable of achieving both low gas permeability and lighter weight has been proposed. For example, as new materials for air permeation preventive layers, various polymer compositions for tires including a thermoplastic resin or blend of a thermoplastic resin and elastomer have been proposed (see, for example, Patent Documents 1 to 3 etc.)

Patent Document 1: Japanese Patent Publication (A) No. 8-216610
Patent Document 2: Japanese Patent Publication (A) No. 8-258506
Patent Document 3: Japanese Patent Publication (A) No. 2003-26931

DISCLOSURE OF THE INVENTION

As further methods for reducing the air leakage rate of pneumatic tires, the method of increasing the thickness of the air permeation preventive layer, the method of using a material with a low air permeability, etc. may be mentioned. However, if increasing the thickness of the air permeation preventive layer, there is the problem that the air permeation preventive layer is liable to be broken due to the flexing and shear of the tire at the time of use. On the other hand, a material having a low air permeation coefficient is generally fragile, and therefore, when placed in a tire, there is the problem that it is broken at the time of building or using the tire.

Accordingly, the object of the present invention is to eliminate the above-mentioned problems of the prior art and to provide a pneumatic tire using a thermoplastic resin composition to achieve both further reduction of the air leakage rate of the pneumatic tire and a good durability and further reducing the weight of the tire.

In accordance with the present invention, there is provided a pneumatic tire comprising an air permeation preventive layer containing a film of a thermoplastic resin composition containing a polyvinyl alcohol or ethylene vinyl alcohol copolymer and a protective film of a rubber composition containing an ethylene propylene rubber (EPM) or ethylene propylene diene rubber (EPDM) adjacent to the air permeation preventive layer, directly or via an adhesive, as one layer in at least one side thereof.

In accordance with the present invention, by placing a film of a thermoplastic resin composition having an air permeation coefficient of, preferably, $2 \times 10^{-12}$ cc·cm/cm$^2$·sec·cmHg or less in a tire sandwiched between rubber layers, it is possible to obtain a pneumatic tire eliminating the problems of the prior art, achieving both a further reduction in the air leakage rate of the pneumatic tire and a good durability, and further reducing the weight of the pneumatic tire. Note that here the air permeation coefficient means the value measured according to JIS K7126 "Gas Permeability Test Method of Plastid Film and Sheet" at 30° C.

BEST MODE FOR CARRYING OUT THE INVENTION

The configuration and action and effects of the present invention will now be explained in detail. The film forming the air permeation preventive layer of the pneumatic tire according to the present invention has an air permeation rate of, preferably, $2 \times 10^{-12}$ cc·cm/cm$^2$·sec·cmHg or less, more preferably $1 \times 10^{-12}$ cc·cm/cm$^2$·sec·cmHg or less. The lower limit of the air permeation rate is not particularly limited, but generally is about $1 \times 10^{-15}$ cc·cm/cm$^2$·sec·cmHg. Further, the thickness of the film forming the air permeation preventive layer of the pneumatic tire is preferably 0.1 µm to 20 µm, more preferably 1 µm to 20 µm. If the air permeation rate exceeds $2 \times 10^{-12}$ cc·cm/cm$^2$·sec·cmHg, the rubber is liable to become inferior in air permeation preventive property and it becomes difficult to make the thickness of the air permeation preventive layer thinner. If the thickness of the film is less than 0.1 µm, the film becomes too thin and lacks strength, and therefore, is liable to become difficult to handle and, further, is liable to be torn. Conversely, if the thickness is more than 20 µm, the film becomes thick. This is not only disadvantageous to the reduction of weight, but also results in the rigidity of the film becoming too high, and therefore, the stress concentrates at the interfaces of the film and rubber layers and the film and rubber layers are liable to peel apart.

In the present invention, the following polymer compositions may be mentioned, as the thermoplastic resin composition used for the air permeation preventive layer. First, as the thermoplastic resin, it is necessary that polyvinyl alcohol (PVOH) and/or ethylene vinyl alcohol copolymer (EVOH) be contained. Specifically, PVOH and/or EVOH are included in an amount, based upon the total weight of the composition, of preferably 20% by weight or more, more preferably 30 to 100% by weight. If the amount is too small, the PVOH and/or EVOH will not form a continuous phase and the air permeation rate will be decreased, and therefore, this is not preferred. The EVOH and PVOH used are known polymers (copolymers). If the air permeation rate is $2 \times 10^{-12}$ cc·cm/cm$^2$·sec·cmHg or less, there is no problem in the use for the present invention. A general commercial product can be used.

For the thermoplastic resin composition of the present invention, in addition to the PVOH and/or EVOH, one or more other polymers may be used in combination therewith. The polymer is not particularly limited, but for example a diene-based rubber and its hydrate (e.g., natural rubber (NR), isoprene rubber (IR), epoxylated natural rubber (E-NR), styrene butadiene rubber (SBR), butadiene rubber (BR), nitrile rubber (NBR), hydrogenated NBR, hydrogenated SBR); olefin-based rubber (e.g., ethylene propylene rubber (EPDM, EPM), maleated ethylene propylene rubber (M-EPM), butyl rubber (IIR), isobutylene and aromatic vinyl or diene-based monomer copolymer); acryl rubber (ACM); halogenated rubber (e.g., Br-IIR, Cl-IIR, brominated isobutylene p-methylstyrene copolymer (Br-IPMS), CR, hydrin rubber (CHR•CHC), chlorosulfonated polyethylene (CSM), chlorinated polyethylene (CM), maleated chlorinated polyethylene (M-CM)); silicone rubber (e.g., methylvinyl silicone rubber, dimethyl silicone rubber, methylphenylvinyl silicone rubber); sulfur-including rubber (e.g., polysulfide rubber); fluorine rubber (e.g., vinylidene fluoride-based rubber, fluorine-including vinylether-based rubber, tetrafluoroethylene-propylene-based rubber, fluorine-including silicone-based rubber, fluorine-including phosphagen-based rubber); thermoplastic elastomer (e.g., styrene-based elastomer, olefin-based elastomer, maleated olefin-based elastomer, polyamide-based elastomer); polyamide (e.g., Nylon 6, Nylon 6.66, Nylon 11, Nylon 12, and MXD6); polyester (e.g., PET, PEN, PBT, and PBN); polynitrile-based resin (e.g., polyacrylonitrile (PAN) or polymethacrylonitrile); polymethacrylate-based resin (e.g., polymethyl methacrylate (PMMA) or polyethyl methacrylate); polypolyvinyl acetate-based resin (e.g., polyvinyl acetate (PVA) or ethylene/polyvinyl acetate copolymer(EVA)); polyvinyl chloride-based resin (e.g., polyvinylidene chloride (PDVC), polyvinyl chloride (PVC), or vinyl chloride/vinylidene chloride copolymer); cellulose-based resin (e.g., cellulose acetate, cellulose acetate butyrate, or carboxymethyl cellulose (CMC)); fluorine-based resin (e.g., polyvinylidene fluoride (PVDF), polyvinyl fluoride (PVF), tetrafluoroethylene/ethylene copolymer); imide-based resin (e.g., aromatic polyimide (PI); olefin-based resin (e.g., polyethylene (PE), polypropylene (PP), ethylene-ethyl acrylate copolymer (EEA), ethylene-octene copolymer (EO), and these maleated products)) etc. may be mentioned. These may be used alone or in any blends thereof.

The thermoplastic resin composition film forming the air permeation preventive layer in the pneumatic tire of the present invention may suitably contain, in addition to the above components, a compatibilizer, antioxidant, vulcanizer, vulcanization accelerator, accelerator activator, retarder, plasticizer, filler, coloring agent, processing aid, softening agent, or other additives to an extent not impairing the necessary characteristics of the tire-use polymer composition used in the present invention.

According to the present invention, an air permeation preventive layer film made of a thermoplastic resin composition having an air permeation coefficient of $2\times10^{-12}$ cc·cm/cm$^2$·sec·cmHg or less is placed in a tire, so as to substantially cover the inside surface of the tire. It is preferable that this air permeation preventive layer is placed at the inside of the tire and that at least one layer of a rubber layer or carcass layer or belt layer or composite layers of the same be placed at the front and back (or inside and outside) of the air permeation preventive layer to sandwich the air permeation preventive layer.

In particular, it is necessary to provide a rubber layer adjacent to the air permeation preventive layer of the pneumatic tire of the present invention, directly or via an adhesive, at least at the tire innermost surface side of the air permeation preventive layer. The thickness of the rubber layer is preferably 0.05 to 7 mm. 0.1 to 2 mm is more preferable. If there is no rubber layer at one adjacent side (inner side) at the tire innermost surface, the two sides are sandwiched by the above rubber composite layer and, therefore, large stress is applied to the air permeation preventive layer from the two sides and the air permeation preventive layer is liable to break or peel off, and therefore, this is not preferable. When the thickness of the inside rubber layer is less than 0.05 mm, the layer is liable to stop functioning as a protective layer of an air permeation preventive layer explained later. Conversely, when the thickness is thicker than 7 mm, the stress applied to the air permeation preventive layer from the sandwiching rubber layers at the two sides becomes greater and breakage or peeling of the air permeation preventive layer is liable to occur, and therefore, this is not preferable.

When placing an air permeation preventive layer of a thin layer containing PVOH and/or EVOH at the tire innermost surface, due to the thinness, it is liable to be damaged by the bladder (cylindrical rubber bag for holding internal pressure given to tire at the time of tire vulcanization) at the time of vulcanization and liable to be damaged at the time of attachment to the rim. Further, if PVOH and/or EVOH absorbs moisture, the air permeability is increased and the desired effects as the air permeation preventive layer are not obtained, and therefore, it is necessary to block the moisture. Furthermore, the innermost surface of the tire may be exposed to wind, rain or sunlight, and therefore, is also required to have light resistance. For this reason, as explained above, it is necessary to sandwich the inner side and the outer side of the air permeation preventive layer containing PVOH and/or EVOH between rubber layers to provide protection at the time of vulcanization, block moisture and improve the weatherability. As the rubber layers sandwiching the air permeation preventive layer, considering the above properties, in particular as the rubber layer positioned at the innermost surface of the tire (inner side of air permeation preventive layer), it is preferable to use a rubber composition including an ethylene propylene rubber (EPM) and/or ethylene propylene diene rubber (EPDM) superior in light resistance and ozone degradation resistance. The content of EPM and/or EPDM in the rubber composition is preferably 10 parts by weight or more, more preferably 40 parts by weight or more, in 100 parts by weight of the rubber. When the content of the EPM and/or EPDM is 10 parts by weight or less, the ability of the rubber composition to block moisture or its weatherability is liable to deteriorate. This is not in line with the objective of protecting the air permeation preventive layer. The rubber composition containing EPM and/or EPDM may include, as other rubber, for example, a diene-based rubber, olefin-based rubber, thermoplastic rubber, etc. in small amounts (e.g., 50% by weight or less). Furthermore, so long as not impairing the object of the present invention, it is possible to use general use additives blended into rubber compositions.

In the pneumatic tire of the present invention, the method of placing the air permeation preventive layer inside the tire is not particularly limited. It is possible to place it at the time of building the tire, attach or bond it after building, or coat it by an ordinary method. However, the thermoplastic resin composition film used in the present invention is extremely thin, and therefore, is preferably handled in the form of a sheet laminated with rubber.

The air permeation preventive layer may also be made a film of just a thermoplastic resin composition, but usually it is preferable to use a laminate with an adhesive layer having bondability with the film and rubber. When there is an adhesive layer in the product before vulcanization, the adhesion of the film and rubber is increased and the work efficiency is improved. After vulcanization, the film and rubber are sufficiently bonded, and therefore, the durability is improved. If the film and rubber do not sufficiently bond, the film may break or peel off at the time of deformation during the use of tire. As such an adhesive layer, for example, a composition comprised of 100 parts by weight of the rubber ingredient (e.g., NR, SBR, IIR, BR, polyisobutylene, IR, styrene-butadiene-styrene block copolymer (SBS), styrene-isoprene-styrene block copolymer or epoxylated or maleated products of the same) into which 0 to 100 parts by weight, preferably 50 to 100 parts by weight, of a rubber filler (e.g., carbon black, calcium carbonate, or silica), 0 to 100 parts by weight (preferably 0 to 50 parts by weight) of an adhesive resin (e.g., RF resin), 0 to 100 parts by weight (preferably 50 to 100 parts by weight) of a tackifier (e.g., terpene resin, terpene phenol resin, modified terpene resin, hydrated terpene resin, rosin ester, alicyclic saturated hydrocarbon resin), etc. are compounded and, into which further a vulcanizer, vulcanization accelerator, oil, antioxidant, plasticizer, etc. are compounded at suitable amounts according to an ordinary method may be used.

When laminating with rubber to obtain a sheet form without using an adhesive layer, it is sufficient to give the rubber bondability with the air permeation preventive layer. As such a rubber composition, for example, a composition comprised of 100 parts by weight of the rubber component (e.g., EPDM, EPM, NR, SBR, IIR, halogenated IIR, BR, polyisobutylene, IR, styrene-butadiene-styrene block copolymer (SBS), styrene-isoprene-styrene block copolymer or their epoxylated and maleated products), into which 0 to 100 parts by weight of a rubber filler (e.g., carbon black, calcium carbonate and silica), 0 to 100 parts by weight of an adhesive resin (e.g., RF resin and alkylphenol resin), 0 to 100 parts by weight of a tackifier (e.g., terpene resin, terpene phenol resin, modified terpene resin, hydrated terpene resin, rosin ester, alicyclic saturated hydrocarbon resin, aromatic hydrocarbon resin), etc. are included and into which further a vulcanizer, vulcanization accelerator, oil, antioxidant, plasticizer, etc. are included in suitable amounts according to an ordinary method may be used according to an ordinary method may be used.

EXAMPLES

Examples will now be used to further explain the present invention, but the scope of the present invention is not limited to these Examples. Note that, to confirm the effect of the present invention, the thermoplastic resin composition was inflation molded to form a film and prepared an air permeation preventive layer. This air permeation preventive layer was adhered to a rubber sheet, then a pneumatic tire was produced by an ordinary method. Each tire thus obtained was examined for appearance, tested for air leakage (i.e., decreasing rate of pressure) and tested for weatherability by the following methods for evaluation.

Preparation of Thermoplastic Resin Composition

Resins were dry blended by the ingredients of formulation shown in Table I (parts by weight) and used for inflation molding.

TABLE I

| Ingredients of formulation | Formulation (% by weight) |
|---|---|
| EVOH*[1] | 70 |
| Nylon 6.66*[2] | 30 |

*[1]Ethylene Vinyl Alcohol L171B made by Kuraray
*[2]6.66 Nylon 5033B made by Ube Industries Preparation of Tackifier-Adhesive Composition To adhere the thermoplastic resin composition to the inside of the tire, the ingredients shown in Table II (parts by weight) were sufficiently mixed using a twin-screw kneader/extruder and extruded in strands from the discharge ports. The strands thus obtained were water cooled, then cut into pellets by a cutter to prepare pellets of a tackifier-adhesive.

TABLE II

| Ingredients of formulation | Formulation (parts by weight) |
|---|---|
| Epoxylated SBS*[1] | 50 |
| SBS*[2] | 50 |
| Tackifier*[3] | 100 |
| Zinc white*[4] | 3 |
| Stearic acid*[5] | 1 |
| Peroxide*[6] | 1 |

*[1]Epofriend AT501 made by Daicel Chemical
*[2]Tufprene 315 made by Asahi Kasei
*[3]Pensel AD made by Arakawa Chemical
*[4]Zinc White No. 3 made by Seido Chemical Industry
*[5]Beads Stearic Acid made by NOF Corporation
*[6]Perkadox 14 made by Kayaku Akzo Inflation Molding Example 1

To place an air permeation preventive layer at the inside of the tire, a film provided with an adhesive on both surfaces was prepared. Using the dry blended thermoplastic resin composition, pellets of the tackifier-adhesive composition and pellets of polyethylene, and using a general four-layer inflation molding apparatus, a laminated film was formed by inflation molding to obtain a laminated film of a thermoplastic resin composition and tackifier-adhesive composition having polyethylene as a base layer. The thickness of the thermoplastic resin composition was made 3 µm, while the thickness of the tackifier-adhesive composition was made 10 µm. The laminated film had a four-layer structure of a tackifier-adhesive composition/thermoplastic resin composition/tackifier-adhesive composition/polyethylene. Note that the base layer of the polyethylene layer was peeled off for use at the time of tire manufacture.

Example 2

A rubber composition was directly laminated, without using an adhesive composition, and no adhesive was provided for placing the air permeation preventive layer inside the tire to thereby prepare a film. Using the dry blended thermoplastic resin composition and the pellets of polyethylene, and using a general two-layer inflation molding apparatus, the laminated film was inflation molded to obtain a laminated film with a thermoplastic resin composition having polyethylene as a base layer. The thickness of the thermoplastic resin composition was 3 µm. The laminated film had a two-layer structure of thermoplastic resin composition/polyethylene. Note that the base layer of the polyethylene layer was peeled off for use at the time of tire manufacture.

Comparative Example 1

A film having an adhesive at one surface for providing an air permeation preventive layer at the innermost surface of the tire was prepared. Using the dry blended thermoplastic resin composition, pellets of a tackifier-adhesive composition and pellets of polyethylene, and using a general three-layer inflation molding apparatus, the laminated film was inflation molded to obtain a laminated film of a thermoplastic resin composition and a tackifier-adhesive composition with polyethylene as a base layer. The thickness of the thermoplastic resin composition was made 3 µm, while the thickness of the tackifier-adhesive composition was made 10 µm. The laminated film had a three-layer structure of a tackifier-adhesive composition/thermoplastic resin composition/polyethylene. Note that the base layer of the polyethylene layer was peeled off for use at the time of tire manufacture.

Tire Manufacture

Example 3

The base layer of the polyethylene layer was peeled off from the air permeation preventive layer film of Example 1.

This was laminated between a 0.5 mm sheet of the rubber composition 1 containing EPDM shown in Table III and a 0.5 mm sheet of the rubber composition 2 containing a diene-based rubber shown in Table IV, the assembly was placed on a drum so that the rubber composition 1 became the drum side and the rubber composition 2 became the tire member side, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Example 1 had the rubber composition 1 containing EPDM at the innermost surface and had an air permeation preventive layer arranged at the inside.

TABLE III

Rubber Composition 1

| Ingredients of formulation | Formulation (parts by weight) |
| --- | --- |
| EPDM*[1] | 100 |
| Carbon black*[2] | 50 |
| Zinc white*[3] | 3 |
| Stearic acid*[4] | 1 |
| Oil*[5] | 10 |
| Wax*[6] | 1 |
| Sulfur*[7] | 2 |
| Vulcanization accelerator*[8] | 1 |
| Antioxidant*[9] | 1 |

*[1]Esprene 505A made by Sumitomo Chemical
*[2]Diablack G made by Mitsubishi Chemical
*[3]Zinc White No. 3 made by Seido Chemical Industry
*[4]Beads Stearic Acid made by NOF Corporation
*[5]Extract No. 4S made by Showa Shell Sekiyu
*[6]Sannoc made by Ouchi Shinko Chemical Industrial
*[7]Oil treated sulfur made by Hosoi Chemical Industry
*[8]Noccelar CZ-G made by Ouchi Shinko Chemical Industrial
*[9]Nocrac 224 made by Ouchi Shinko Chemical Industrial

TABLE IV

Rubber Composition 2

| Ingredients of formulation | Formulation (parts by weight) |
| --- | --- |
| Natural rubber*[1] | 50 |
| SBR*[2] | 50 |
| Carbon black*[3] | 50 |
| Zinc White*[4] | 3 |
| Stearic acid*[5] | 2 |
| Oil*[6] | 10 |
| Wax*[7] | 1 |
| Sulfur*[8] | 2 |
| Vulcanization accelerator*[9] | 1 |
| Antioxidant*[10] | 1 |

*[1]Natural rubber TSR20 made by NUSIRA
*[2]Nipol 1502 made by Nippon Zeon
*[3]Diablack G made by Mitsubishi Chemical
*[4]Zinc White No. 3 made by Seido Chemical Industry
*[5]Beads Stearic Acid made by NOF Corporation
*[6]Extract No. 4S made by Showa Shell Sekiyu
*[7]Sannoc made by Ouchi Shinko Chemical Industrial
*[8]Oil-treated sulfur made by Hosoi Chemical Industry
*[9]Noccelar CZ-G made by Ouchi Shinko Chemical Industrial
*[10]Nocrac 224 made by Ouchi Shinko Chemical Industrial Example 4

The base layer of the polyethylene layer was peeled off from the air permeation preventive layer film of Example 1. This was laminated between a 0.5 mm sheet of the rubber composition 3 containing EPM shown in Table V and a 0.5 mm sheet of the rubber composition 2 containing a diene-based rubber shown in Table IV, the assembly was placed on a drum so that the rubber composition 3 became the drum side and the rubber composition 2 became the tire member side, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Example 4 had the rubber composition 3 containing EPM arranged at the innermost surface and had an air permeation preventive layer placed at the inside.

TABLE V

Rubber Composition 3

| Ingredients of formulation | Formulation (parts by weight) |
| --- | --- |
| EPM*[1] | 100 |
| Carbon black*[2] | 50 |
| Oil*[3] | 10 |
| Wax*[4] | 1 |
| Cross-linking agent*[5] | 5 |
| Cross-linking aid*[6] | 2 |
| Antioxidant*[7] | 1 |

*[1]EP11 made by JSR
*[2]Diablack G made by Mitsubishi Chemical
*[3]Process Oil 123 made by Showa Shell Sekiyu
*[4]Sannoc made by Ouchi Shinko Chemical Industrial
*[5]Perkadox 14/40 made by Kayaku Akzo
*[6]TAC made by Kayaku Akzo
*[7]Nocrac 224 made by Ouchi Shinko Chemical Industrial Example 5

The base layer of the polyethylene layer was peeled off from the air permeation preventive layer film of Example 2. This was laminated between two 0.5 mm sheets of the rubber composition 4 containing EPDM shown in Table VI, the assembly was placed on a drum, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Example 5 had the rubber composition 4 containing EPDM, having bondability with the air permeation preventive layer, placed at the innermost surface and had an air permeation preventive layer placed at the inside.

TABLE VI

Rubber Composition 4

| Ingredients of formulation | Formulation (parts by weight) |
| --- | --- |
| EPDM*[1] | 50 |
| SBR*[2] | 50 |
| Carbon black*[3] | 50 |
| Zinc white*[4] | 3 |
| Stearic acid*[5] | 1 |
| Oil*[6] | 10 |
| Wax*[7] | 1 |
| Aromatic-based petroleum resin*[8] | 4 |
| Cross-linking agent*[9] | 5 |
| Antioxidant*[10] | 1 |

*[1]Esprene 505A made by Sumitomo Chemical
*[2]Nipol 1502 made by Nippon Zeon
*[3]Diablack G made by Mitsubishi Chemical
*[4]Zinc White No. 3 made by Seido Chemical Industry
*[5]Beads Stearic Acid made by NOF Corporation
*[6]Extract No. 4S made by Showa Shell Sekiyu
*[7]Sannoc made by Ouchi Shinko Chemical Industrial
*[8]FR-120 made by Air Water Inc.
*[9]Tackrol 250-1 made by Taoka Chemical
*[10]Nocrac 200 made by Ouchi Shinko Chemical Industrial Example 6

The base layer of the polyethylene layer was peeled off from the air permeation preventive layer film of Example 1. A 0.01 mm sheet of the rubber composition 1 containing EPDM shown in Table III and a 0.5 mm sheet of the rubber composition 2 containing a diene-based rubber shown in Table IV were laminated thereon, the assembly was wrapped around the drum so that rubber composition 1 became the drum side and the rubber composition 2 became the tire member side, then the other tire members were superposed to form a green tire by an ordinary method. Next, this green tire was vulcanized (conditions: 180° C.×10 minutes) to produce a pneumatic tire of a tire size: 165SR13 (rim size: 13×41/2-J). The tire of Example 6 had the rubber composition 1 containing EPDM arranged as an extremely thin layer at the innermost surface and had an air permeation preventive layer placed at the inside.

Example 7

The base layer of the polyethylene layer was peeled off from the air permeation preventive layer of Example 1. A 10 mm sheet of the rubber composition 1 containing EPDM shown in Table III and a 0.5 mm sheet of the rubber composition 2 containing a diene-based rubber shown in Table IV were laminated thereon, the assembly was wrapped around the drum so that rubber composition 1 became the drum side and the rubber composition 2 became the tire member side, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Example 7 had the rubber composition 1 containing EPDM arranged as a thick layer at the innermost surface and had an air permeation preventive layer arranged at the inside.

Comparative Example 2

The base layer of the polyethylene layer was peeled off from the air permeation preventive layer of Comparative Example 1. This was wrapped around the tire-building drum so that thermoplastic resin composition layer became the drum side and the tackifier-adhesive composition layer became the tire member side, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Comparative Example 2 had an air permeation preventive layer at the innermost surface.

Comparative Example 3

The base layer of the polyethylene layer was peeled off from the air permeation preventive layer film of Example 1 and sandwiched between two 0.5 mm sheets of the rubber composition including a diene-based rubber shown in Table IV. The assembly was placed on a drum, then the other tire members were superposed to form a green tire by an ordinary method. Next, this green tire was vulcanized (conditions: 180° C.×10 minutes) to produce a pneumatic tire having a tire size: 165SR13 (rim size: 13×41/2-J). The tire of Comparative Example 3 had a rubber composition comprised of a diene-based rubber not containing any EPDM at its innermost surface and had an air permeation preventive layer at its inside.

Examination of Outside Appearance

The inner surface of each tire after vulcanization was visually examined for the outer appearance. Tires having friction marks or tears of 10% or more of the tire inside surface area were judged as "poor", tires having light friction marks or tears of less than 10% of the tire inside surface area were judged as "good", and tires having no such defects were judged as "very good". The results are shown in Table VII. The tires of Examples 3, 4, 5, and 7 and Comparative Example 3 did not show any particular defects, while the tire of Example 6 with an extremely thin rubber composition containing EPDM placed at the innermost surface of the tire showed light friction marks and tearing in examination after vulcanization, while the tire of Comparative Example 2 having an air permeation preventive layer at the innermost surface of the tire showed serious defects.

Air Leakage Test Method (Rate of Pressure Drop)

Each tire was allowed to stand for three months at an initial pressure of 200 kPa and room temperature of 21° C., without any load. The internal pressure was measured at intervals of every four days. Using the measured pressure $P_t$, initial pressure $P_0$, and number of elapsed days t, regression was performed by the following formula to find the $\alpha$ value. The results are shown in Table VII. In Comparative Example 2, the air permeation preventive layer was exposed at the tire inner surface, and therefore, due to the effects of moisture absorption etc., the air leakage became greater. Further, in Example 6, the layer of the rubber composition at the innermost surface of the tire was thin, while in Comparative Example 3, a diene-based rubber composition was used, and therefore, the permeability of the moisture was high and the air permeation preventive layer ended up absorbing moisture, and therefore, the air leakage was somewhat increased.

$$(P_t/P_0)=\exp(-\alpha t)$$

The $\alpha$ obtained was used, t=30 (days) was entered, and the rate of pressure decrease per month $\beta(\%/month)=[1-\exp(-\alpha t)]\times100$ was obtained.

Evaluation of Weatherability

The tires of Examples 3 to 7 and Comparative Examples 2 to 3 were laid flat on the ground and allowed to stand outdoors for three months, then were evaluated for weatherability by the following durability test.

Tire Durability Test Method

165SR13 steel radial tires (rim 13×41/2-J) were run for 10,000 km on an actual road at an air pressure of 140 kPa and a load of 5.5 kN. After the run, the tires were detached from the rims, then the innermost surfaces of the tires were visually observed. Tires having serious cracks of 1 cm or more on the innermost surface or visible wrinkles or peeling or blistering were judged as "Poor", tires having light cracks of less than 1 cm or wrinkles or peeling or blistering were judged as "good", and tires having no defects at all were judged as "very good". The results are shown in Table VII. As a result of the durability test, in Examples 3, 4 and 5, no defects were observed, but in Example 6, the protective layer of the rubber composition laminated on the inside surface of the air permeation preventive layer is thin, and therefore, the weatherability was slightly inferior and light cracking was observed. In Example 7, the protective layer of the rubber composition laminated on the inside surface of the air permeation preventive layer was thick, and therefore, light peeling occurred from the air permeation preventive layer. In Comparative Example 2, serious cracks were observed in the air permeation preventive layer. In Comparative Example 3, since a rubber composition mainly composed of a diene-based rubber was used, as a protective layer, the weatherability was inferior and serious cracks were observed.

TABLE VII

|  | Example 3 | Example 4 | Example 5 | Example 6 | Example 7 | Comparative Example 2 | Comparative Example 3 |
|---|---|---|---|---|---|---|---|
| Examination of appearance | Very good | Very good | Very good | Good | Very good | Poor | Very good |
| Air leakage test | 1%/month | 1%/month | 1%/month | 1.5%/month | 1%/month | 2%/month | 1.5%/month |
| Tire weatherability test | Very good | Very good | Very good | Good | Good | Poor | Poor |
| Protective layer properties | EPDM-based protective layer | EPM-based protective layer | Adhesive EPDM-based protective layer | 0.01 mm EPDM-based protective layer | 10 mm EPDM-based protective layer | No protective layer | Diene-based protective layer |

INDUSTRIAL APPLICABILITY

As explained above, by placing a film of a thermoplastic resin composition containing EVOH having an air permeation coefficient of $2\times10^{-12}$ cc·cm/cm$^2$·sec·cmHg or less at a tire sandwiched with a protective layer of a rubber composition containing EPDM or EPM, it is possible to eliminate the problems of the prior art and to obtain a pneumatic tire using a thermoplastic resin composition to achieve both a further reduction in the air leakage rate and a good durability and still obtain a lighter weight.

The invention claimed is:

1. A pneumatic tire comprising:
(A) an air permeation preventive layer containing a film of a thermoplastic resin composition containing a polyvinyl alcohol or ethylene vinyl alcohol copolymer having an air permeation coefficient of $2\times10^{-12}$ cc·cm/cm$^2$·sec·cmHg or less; and
(B) a protective film of a rubber composition consisting essentially of, as a main component, an ethylene propylene rubber (EPM) or ethylene propylene diene rubber (EPDM) and, as a smaller component, at least one member selected from the group consisting of a diene-based rubber, an olefin-based rubber and a thermoplastic rubber, adjacent to the air permeation preventive layer, directly or via an adhesive, as one layer located at least at the innermost surface of the air permeation preventive layer (A), which is arranged at the innermost surface of the tire, whereby said tire includes a further reduction in the air leakage rate of the pneumatic tire with a good durability and a reduction in the weight of the tire.

2. A pneumatic tire as claimed in claim 1, wherein the air permeation preventive layer (A) has a thickness of 0.1 to 20 µm.

3. A pneumatic tire as claimed in claim 1, wherein the rubber composition containing EPM or EPDM has an EPM or EPDM content of 10 parts by weight or more, based upon 100 parts by weight of the rubber.

4. A pneumatic tire as claimed in claim 1, wherein the air permeation preventive layer (A) is sandwiched with the protective film (B) at both the inner and outer surfaces thereof.

5. A pneumatic tire as claimed in claim 1, wherein the protective film (B) containing EPM or EPDM has a thickness of 0.05 to 7 mm.

6. A pneumatic tire as claimed in claim 2, wherein the rubber composition containing EPM or EPDM has an EPM or EPDM content of 10 parts by weight or more, based upon 100 parts by weight of the rubber.

7. A pneumatic tire as claimed in claim 2, wherein the protective film (B) containing EPM or EPDM has a thickness of 0.05 to 7 mm.

8. A pneumatic tire as claimed in claim 3, wherein the protective film (B)-containing EPM or EPDM has a thickness of 0.05 to 7 mm.

9. A pneumatic tire as claimed in claim 4, wherein the protective film (B) containing EPM or EPDM has a thickness of 0.05 to 7 mm.

10. A pneumatic tire as claimed in claim 5, wherein the protective film (B) containing EPM or EPDM has a thickness of 0.05 to 7 mm.

* * * * *